(12) United States Patent
Matsumura et al.

(10) Patent No.: US 12,464,539 B2
(45) Date of Patent: Nov. 4, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 406 days.

(21) Appl. No.: 18/250,095

(22) PCT Filed: Oct. 22, 2020

(86) PCT No.: PCT/JP2020/039732
§ 371 (c)(1),
(2) Date: Apr. 21, 2023

(87) PCT Pub. No.: WO2022/085155
PCT Pub. Date: Apr. 28, 2022

(65) Prior Publication Data
US 2023/0397226 A1  Dec. 7, 2023

(51) Int. Cl.
*H04W 72/232* (2023.01)
*H04W 16/28* (2009.01)
*H04W 72/1268* (2023.01)

(52) U.S. Cl.
CPC ......... *H04W 72/232* (2023.01); *H04W 16/28* (2013.01); *H04W 72/1268* (2013.01)

(58) Field of Classification Search
CPC ........... H04W 72/1268; H04W 72/232; H04W 16/28
(Continued)

(56) References Cited

U.S. PATENT DOCUMENTS

2019/0261281 A1\*  8/2019  Jung ................... H04W 52/346

FOREIGN PATENT DOCUMENTS

| EP | 4185037 A1 \* | 5/2023 | ........ H04W 72/1268 |
| EP | 4380250 A2 \* | 6/2024 | ............ H04W 52/10 |

(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Peter G Solinsky
(74) *Attorney, Agent, or Firm* — Osha Bergman Watanabe & Burton LLP

(57) ABSTRACT

A terminal according to one aspect of the present disclosure includes a receiving section that receives DCI based on a specific assumption regarding a size of a sounding reference signal resource indicator (SRI) field of the DCI scheduling a physical uplink shared channel (PUSCH) when a control resource set (CORESET) pool index is configured to at least one CORESET, and a control section that determines spatial relation information for the PUSCH based on at least one of the SRI field and a CORESET pool index of a CORESET in which the DCI is detected. According to one aspect of the present disclosure, UL transmission can be appropriately controlled even in a case where multi-TRPs are used.

5 Claims, 14 Drawing Sheets

(58) Field of Classification Search
USPC .......................................................... 370/329
See application file for complete search history.

(56) References Cited

FOREIGN PATENT DOCUMENTS

| WO | WO-2021183029 A2 * | 9/2021 | ........... H04L 1/1887 |
| WO | WO-2021207402 A1 * | 10/2021 | ............ H04W 72/23 |

OTHER PUBLICATIONS

International Search Report issued in corresponding International Application No. PCT/JP2020/039732, mailed on May 11, 2021 (5 pages).
Written Opinion issued in corresponding International Application No. PCT/JP2020/039732, mailed on May 11, 2021 (3 pages).
Qualcomm Incorporated; "Enhancements on Multi-TRP for PDCCH, PUCCH and PUSCH"; 3GPP TSG-RAN WG1 Meeting #102-e, R1-2006791; e-Meeting; Aug. 17-28, 2020 (14 pages).
Office Action issued in Japanese Patent Application No. 2022-556330, dated Feb. 4, 2025 (6 pages).
Office Action issued in Japanese Patent Application No. 2022-556330, dated Oct. 15, 2024 (4 pages).

* cited by examiner

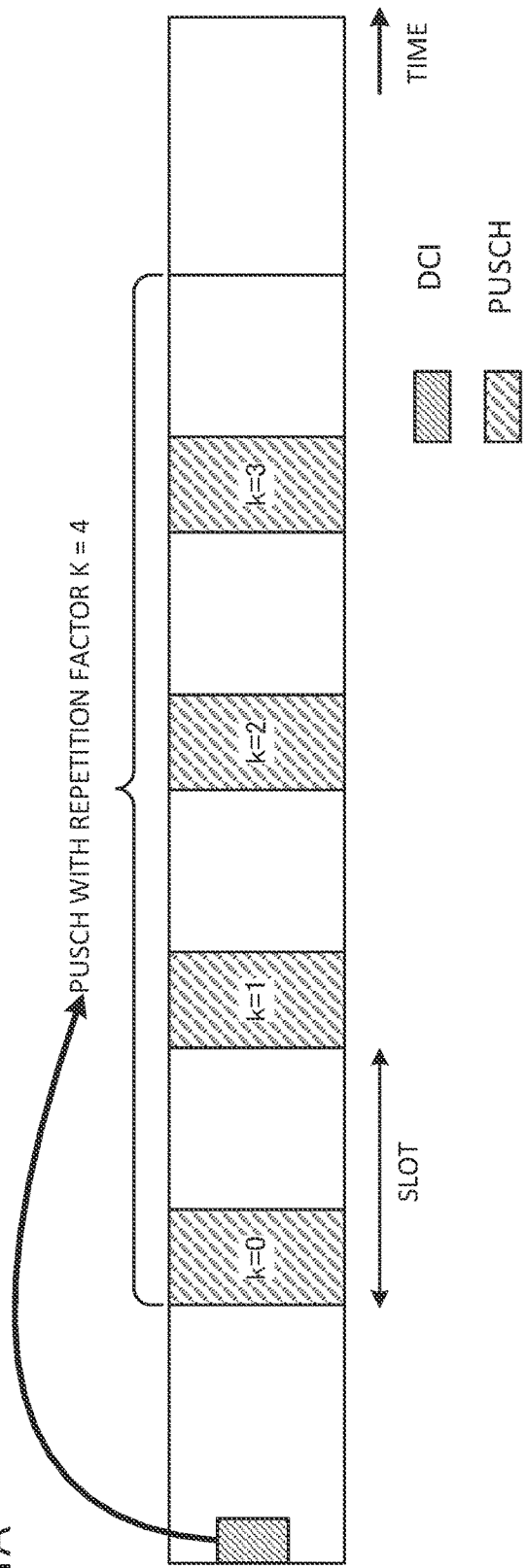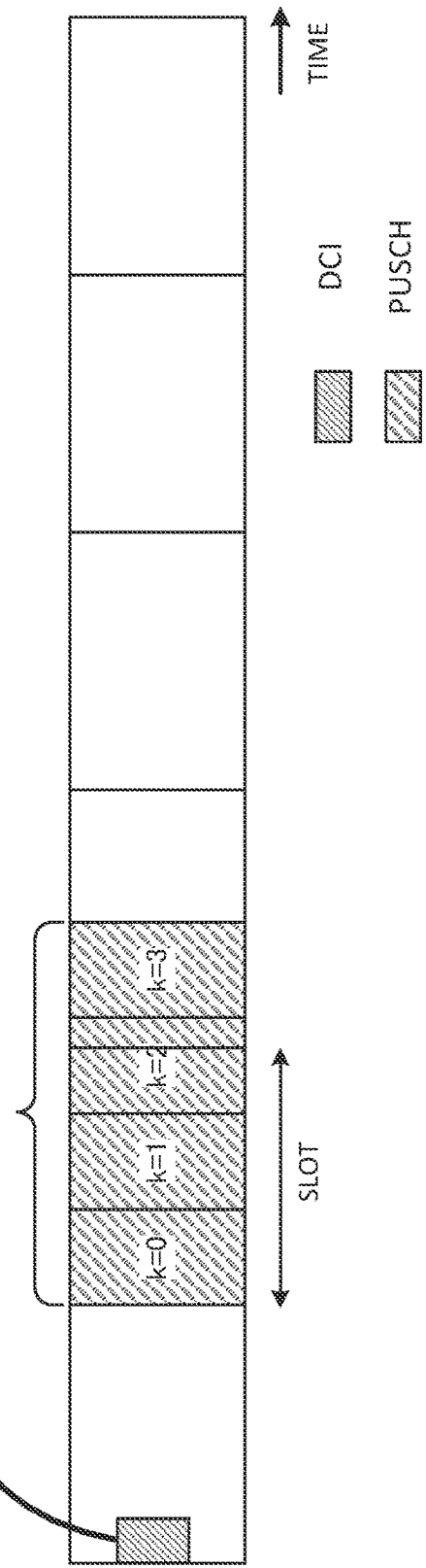

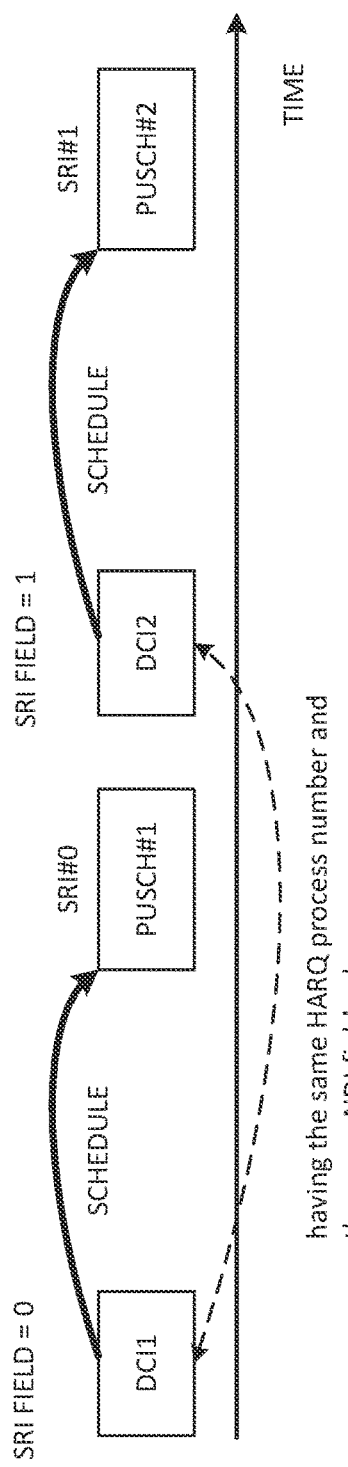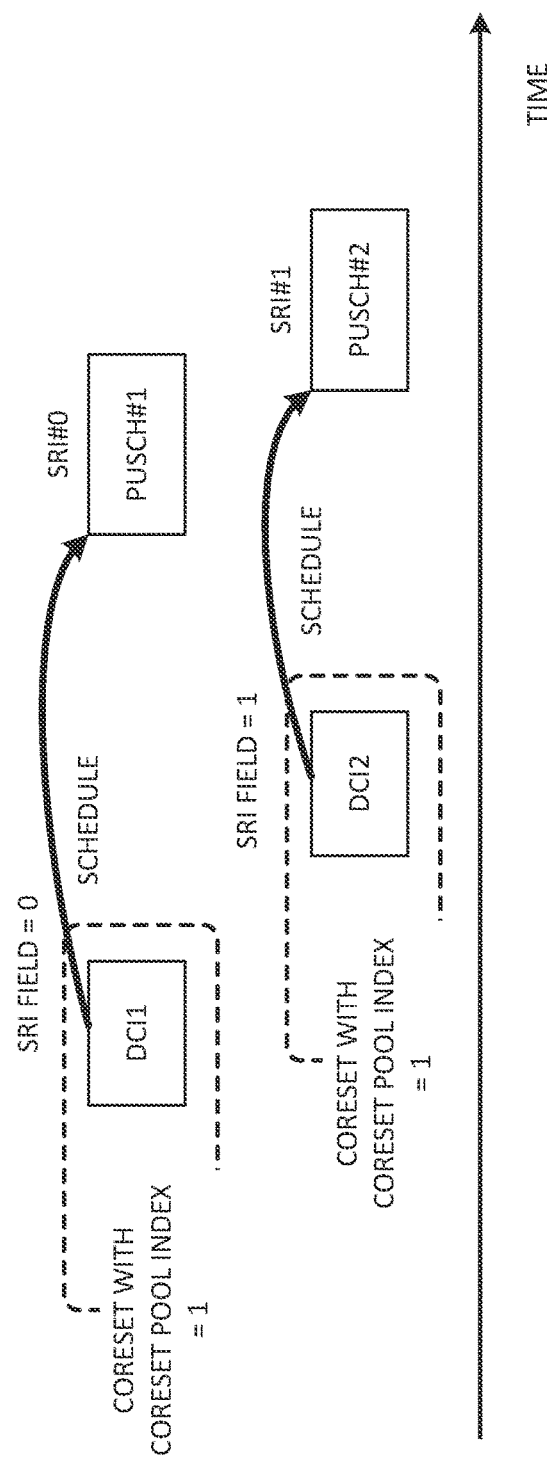

FIG. 9A

| SRS RESOURCE ID | SRS RESOURCE |
|---|---|
| 0 | SRS#0_0 |
| 1 | SRS#0_1 |

SRS RESOURCE SET ID = 0 with usage = CODEBOOK

↑ SRI#0_0
↑ SRI#0_1

CORESET POOL INDEX = 0

FIG. 9B

| SRS RESOURCE ID | SRS RESOURCE |
|---|---|
| 2 | SRS#1_0 |
| 3 | SRS#1_1 |

SRS RESOURCE SET ID = 1 with usage = CODEBOOK

↑ SRI#1_0
↑ SRI#1_1

CORESET POOL INDEX = 1

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In the NR, communication using one or a plurality of transmission/reception points (TRP) (multi-TRPs) has been studied.

However, when transmission for multi-TRPs is to be performed using the existing Rel. 15/16 specification, there is a problem that performance, scheduling flexibility, and the like are limited. Therefore, according to the existing Rel. 15/16 specification, UL transmission over the M-TRP is not appropriately performed, and throughput may be reduced or communication quality may be degraded.

Thus, an object of the present disclosure is to provide a terminal, a radio communication method, and a base station that can appropriately control UL transmission even in a case where multi-TRPs are used.

Solution to Problem

A terminal according to one aspect of the present disclosure includes a receiving section that receives DCI based on a specific assumption regarding a size of a sounding reference signal resource indicator (SRI) field of the DCI scheduling a physical uplink shared channel (PUSCH) when a control resource set (CORESET) pool index is configured to at least one CORESET, and a control section that determines spatial relation information for the PUSCH based on at least one of the SRI field and a CORESET pool index of a CORESET in which the DCI is detected.

Advantageous Effects of Invention

According to one aspect of the present disclosure, UL transmission can be appropriately controlled even in a case where multi-TRPs are used.

BRIEF DESCRIPTION OF DRAWINGS

FIGS. 1A and 1B are diagrams illustrating examples of repetition transmission of PUSCH.

FIGS. 5A and 5B are diagrams illustrating examples of problems in a case where transmission for the M-TRP is performed using the existing Rel. 15/16 specification.

FIGS. 9A and 9B are diagrams illustrating an example of configurations of an SRS resource set and an SRS resource according to Embodiment 3.1.

DESCRIPTION OF EMBODIMENTS (Repetition Transmission)

Figures 2A, 2B:
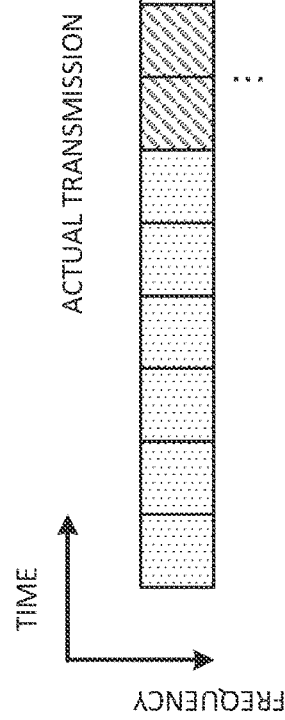
FIGS. 2A and 2B are diagrams illustrating examples of an invalid symbol pattern.

In Rel. 15, repetition transmission is supported in data transmission. For example, a base station (network (NW), gNB) repeatedly transmits DL data (for example, downlink shared channel (PDSCH)) for a given number of times. Alternatively, a UE repeatedly transmits UL data (for example, uplink shared channel (PUSCH)) for a given number of times.

FIG. 1A is a diagram illustrating an example of repetition transmission of PUSCH. FIG. 1A illustrates an example in which a given number of PUSCH repetitions are scheduled by a single piece of DCI. The number of repetitions is also referred to as a repetition factor K or an aggregation factor K.

In FIG. 1A, the repetition factor K=4, but the value of K is not limited to this. In addition, an n-th repetition is also referred to as an n-th transmission occasion, and the like, and may be identified by a repetition index k ($0 \leq k \leq K-1$). In addition, FIG. 1A illustrates repetition transmission of PUSCH dynamically scheduled by the DCI (for example, dynamic grant-based PUSCH), which may be applied to repetition transmission of a configured grant-based PUSCH.

For example, in FIG. 1A, the UE receives information indicating the repetition factor K (for example, aggregationFactorUL or aggregationFactorDL) semi-statically by higher layer signaling. Here, higher layer signaling may be, for example, any of radio resource control (RRC) signaling, medium access control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), or the like.

The UE controls PDSCH reception processing (for example, at least one of reception, demapping, demodulation, and decoding) or PUSCH transmission processing (for example, at least one of transmission, mapping, modulation, and coding) in K consecutive slots based on at least one of the following field valued (or information indicated by the field value) in the DCI:

Allocation of time domain resources (for example, start symbol, the number of symbols in each slot, and the like),
Allocation of frequency domain resources (for example, a given number of resource blocks (RBs), a given number of resource block groups (RBGs)),
Modulation and Coding Scheme (MCS) index,
Demodulation reference signal (DMRS) configuration of PUSCH, and
Spatial relation information (spatial relation info) of PUSCH, or Transmission Configuration Indication or Transmission Configuration Indicator (TCI) state (TCI-state).

The same symbol allocation may be applied between consecutive K slots. FIG. 1A illustrates a case where the PUSCH in each slot is allocated to a given number of symbols from the head of the slot. The same symbol allocation between slots may be determined as described in the above time domain resource allocation.

For example, the UE may determine the symbol allocation in each slot based on the start symbol S and the number of symbols L (for example, Start and Length Indicator (SLIV)) determined based on the value m of a given field (for example, the TDRA field) in the DCI. Note that the UE may determine the first slot based on the K2 information determined based on the value m of a given field (for example, the TDRA field) of the DCI.

On the other hand, the redundancy versions (RVs) applied to the TBs based on the same data may be the same or at least partially different between the consecutive K slots. For example, the RV applied to the TB in the n-th slot (transmission occasion, repetition) may be determined based on the value of a given field (for example, the RV field) in the DCI.

When a resource assigned in consecutive K slots is different in a communication direction in UL, DL, or flexible and at least one symbol in each slot indicated by at least one of uplink and downlink communication direction instruction information for TDD control (for example, "TDD-UL-DL-ConfigCommon" and "TDD-UL-DL-ConfigDedicated" of RRC IE) and a slot format identifier (slot format indicator) of DCI (for example, DCI format 2_0), the resource of the slot including the symbol may not be transmitted (or not received).

In Rel. 15, repetition transmission of PUSCH is performed over a plurality of slots (in units of slots) as illustrated in FIG. 1A. However, in Rel. 16 and subsequent releases, it is also assumed that repetition transmission of PUSCH is performed in units shorter than slots (for example, in units of subslots, in units of mini slots, or in units of a given number of symbols) (see FIG. 1B).

In FIG. 1B, the repetition factor K=4, but the value of K is not limited to this. In addition, an n-th repetition is also referred to as an n-th transmission occasion, and the like, and may be identified by a repetition index k ($0 \leq k \leq K-1$). In addition, FIG. 1B illustrates repetition transmission of PUSCH (for example, dynamic grant-based PUSCH) dynamically scheduled by the DCI, but it may be applied to repetition transmission of a configured grant-based PUSCH.

The UE may determine the symbol allocation of PUSCH transmission (for example, PUSCH with k=0) in a given slot based on the start symbol S and the number of symbols L (for example, StartSymbol and length) determined based on the value m of a given field (for example, the TDRA field) in the DCI of the PUSCH. Note that the UE may determine the given slot based on the Ks information determined based on the value m of the given field (for example, the TDRA field) of the DCI.

The UE may dynamically receive information indicating repetition factor K (for example, numberofrepetitions) using downlink control information. The repetition factor may be determined based on the value m in the given field (for example, TDRA field) in the DCI. For example, a table in which correspondence between the bit value notification of which is performed by the DCI and the repetition factor K, the start symbol S, and the number of symbols L is defined may be supported.

The slot-based repetition transmission illustrated in FIG. 1A may be referred to as a repetition transmission type A (for example, PUSCH repetition Type A), and the subslot-based repetition transmission illustrated in FIG. 1B may be referred to as a repetition transmission type B (for example, PUSCH repetition Type B).

The UE may be configured to apply at least one of the repetition transmission type A and the repetition transmission type B. For example, notification of the repetition transmission type applied by the UE may be performed from the base station to the UE using higher layer signaling (for example, PUSCHRepTypeIndicator).

Either one of the repetition transmission type A and the repetition transmission type B may be configured in the UE for each DCI format scheduling the PUSCH.

For example, for a first DCI format (for example, DCI format 0_1), if higher layer signaling (for example, PUSCHRepTypeIndicator-AorDCIFormat0_1) is configured to the repetition transmission type B (for example, PUSCH-RepTypeB), the UE applies the repetition transmission type B for the PUSCH repetition transmission scheduled in the first DCI format. Otherwise (for example, in a case where PUSCH-RepTypeB is not configured or in a case where PUSCH-RepTypA is configured), the UE applies the repetition transmission type A for the PUSCH repetition transmission scheduled in the first DCI format.

(Invalid Symbol Pattern)

In a case where the repetition transmission type B is applied to the PUSCH transmission, it is also considered to notify the UE of information regarding symbols (or symbol patterns) that cannot be used for the PUSCH transmission. The symbol pattern that cannot be used for PUSCH transmission may be referred to as an invalid symbol pattern or the like.

Notification of an invalid symbol pattern using at least one of higher layer signaling and DCI has been studied. The DCI may be in a given DCI format (for example, at least one of DCI formats 0_1 and 0_2).

For example, information regarding an invalid symbol pattern that cannot be used for PUSCH transmission is notified to the UE by using a first higher layer parameter. In addition, the UE may be notified whether to apply the information regarding the invalid symbol pattern by using the DCI. In this case, a bit field (a field for notification of whether to apply the invalid symbol pattern) for instructing whether to apply the information regarding the invalid symbol pattern may be configured in the DCI.

Further, the UE may be notified of the presence or absence of the configuration of the field for notification (or additional bits) in the DCI by using a second higher layer parameter. That is, when the information regarding the invalid symbol pattern is notified by the first higher layer parameter, the UE may determine whether to apply the information regarding the invalid symbol pattern based on the second higher layer parameter and the DCI.

If the first higher layer parameter is not notified or configured, the UE may control the transmission of the PUSCH without considering the invalid symbol pattern. When the first higher layer parameter is notified or configured, the UE may determine whether the invalid symbol pattern is applied based on the second higher layer parameter and the DCI. For example, when the second higher layer parameter instructs the DCI to add an additional bit (or, a given field) instructing whether to apply the invalid symbol pattern, the UE may determine whether to apply the invalid symbol pattern based on the given field.

The first higher layer parameter only needs to be information notifying of a symbol pattern that becomes invalid for transmission of the PUSCH, and for example, a bitmap format may be applied (see FIG. 2A). FIG. 2A is a diagram illustrating an example of a case where an invalid symbol pattern is defined by a bitmap (1-D bitmap) for a time domain. The UE may determine resources available for PUSCH transmission in one or more frequency bandwidths (for example, the Bandwidth Part (BWP)) based on the information regarding the invalid symbol pattern (see FIG. 2B).

Here, a case where one or a common invalid symbol pattern is applied to a plurality of BWPs is illustrated, but different invalid symbol patterns may be configured or applied for each BWP.

(Nominal Repetitions/Actual Repetitions)

In a case where repetition transmission is performed in units of subslots by applying the repetition transmission type B, there is a case where a given repetition transmission crosses a slot boundary depending on the repetition factor (K), the unit of data allocation, and the like.

Figure 3A:
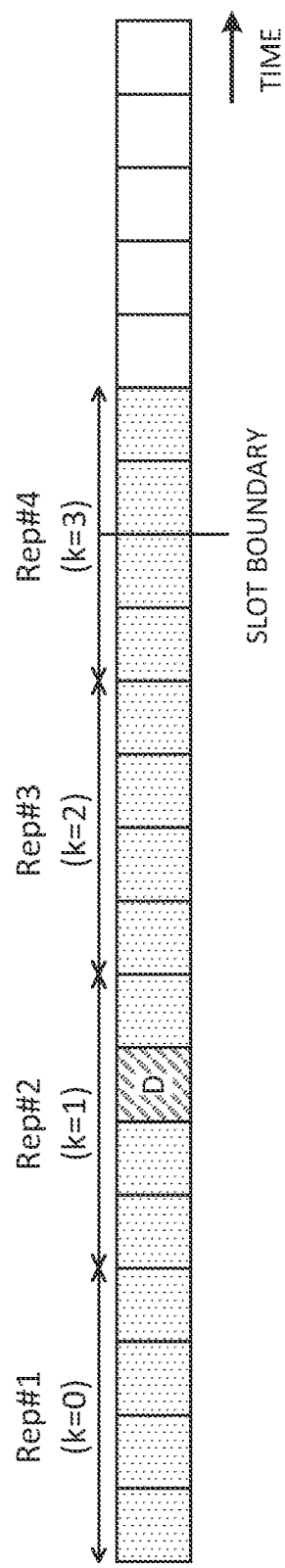
FIGS. 3A and 3B are diagrams illustrating examples of nominal repetitions and actual repetitions.

FIG. 3A illustrates an example of a case where the repetition factor (K) is 4 and the repetition transmission type B in a case where the PUSCH length (L) is 4 is applied. In FIG. 3A, a PUSCH with k=3 is arranged across a slot boundary. In such a case, the PUSCH may be divided (or segmented) with respect to the slot boundary and transmitted (see FIG. 3B).

In addition, a case is also assumed in which a symbol (for example, DL symbol, or invalid symbol, or the like) that cannot be used for PUSCH transmission is included in the slot. FIG. 3A illustrates a case where some symbols in which the PUSCH with k=1 is arranged include symbols that cannot be used for the PUSCH transmission (here, the DL symbol). In such a case, PUSCH transmission may be performed using symbols excluding the DL symbols (see FIG. 3B).

In a case where a DL symbol (or invalid symbol) is included in a symbol other than both ends in an allocated symbol of a given PUSCH, PUSCH transmission may be performed using a symbol other than the DL symbol portion. In this case, the PUSCH may be divided (or segmented).

Figure 3B:
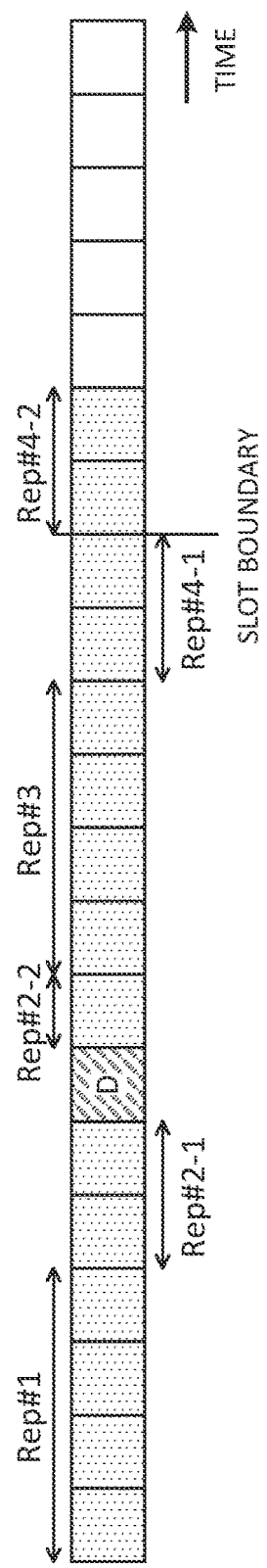

FIG. 3B illustrates a case where the PUSCH with k=1 (Rep #2) is divided into two by the DL symbol (Rep #2-1 and #2-2), and the PUSCH with k=3 (Rep #4) is divided into two by the slot boundary (Rep #4-1 and #4-2) in the subslot-based repetition transmission.

Note that the repetition transmission before considering the DL symbol, the invalid symbol, or the slot boundary (FIG. 3A) may be referred to as nominal repetitions. The repetition transmission in consideration of the DL symbol, the invalid symbol, or the slot boundary (FIG. 3B) may be referred to as actual repetitions.

(Spatial Relation for SRS and PUSCH)

In Rel. 15 NR, the UE may receive information (SRS configuration information, for example, a parameter in the RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be associated with a given number of SRS resources (given number of SRS resources may be grouped). Each SRS resource may be specified by an SRS resource identifier (SRS Resource Indicator (SRI)) or an SRS resource ID (Identifier).

The SRS resource set information may include information of an SRS resource set ID (SRS-ResourceSetId), a list of SRS resource IDs (SRS-ResourceId) used in the resource set, an SRS resource type (for example, one of periodic SRS, semi-persistent SRS, and aperiodic CSI (Aperiodic SRS)), and SRS usage.

Here, the SRS resource type may indicate any one of a periodic SRS (P-SRS), a semi-persistent SRS (SP-SRS), and an aperiodic CSI (aperiodic SRS (A-SRS)). The UE may periodically (or periodically after activation) transmit the P-SRS and the SP-SRS, and transmit the A-SRS based on the SRS request of the DCI.

Further, the usage (the RRC parameter "usage" or the Layer-1 (L1) parameter "SRS-SetUse") may be, for example, beam management, codebook (CB), non-codebook (NCB), antenna switching, or the like. SRS used for the codebook or the non-codebook may be used to determine a precoder for codebook-based or non-codebook-based PUSCH transmission based on SRI.

For example, in the case of the codebook-based transmission, the UE may determine the precoder for the PUSCH transmission based on the SRI, a Transmitted Rank Indicator (TRI), and a Transmitted Precoding Matrix Indicator (TPMI). The UE may determine the precoder for the PUSCH transmission based on the SRI, for the non-codebook-based transmission.

The SRS resource information may include an SRS resource ID (SRS-ResourceId), the number of SRS ports, an SRS port number, a transmission Comb, an SRS resource mapping (for example, time and/or frequency resource location, resource offset, cycle of resource, number of repetitions, number of SRS symbols, SRS bandwidth, and the like), hopping-related information, an SRS resource type, a sequence ID, spatial relation information of an SRS, and the like.

The spatial relation information (for example, "spatialRelationInfo" of the RRC information element) of the SRS may indicate spatial relation information between a given reference signal and the SRS. The given reference signal may be at least one of a Synchronization Signal/Physical Broadcast Channel (SS/PBCH) block, a Channel State Information Reference Signal (CSI-RS), and SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the given reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Further, an SRS index, an SRS resource ID, and an SRI may be replaced with each other.

The spatial relation information of the SRS may include a serving cell index, a BWP index (BWP ID), and the like corresponding to the given reference signal.

When spatial relation information regarding the SSB or CSI-RS and the SRS is configured for a given SRS resource, the UE may transmit the SRS resource by using the same spatial domain filter (spatial domain transmission filter) as a spatial domain filter (spatial domain reception filter) for receiving the SSB or CSI-RS. In this case, the UE may assume that the UE reception beam of the SSB or CSI-RS and the UE transmission beam of the SRS are the same.

For a given SRS (target SRS) resource, when spatial relation information on another SRS (reference SRS) and the SRS (target SRS) is configured, the UE may transmit the target SRS resource by using the same spatial domain filter (spatial domain transmission filter) as a spatial domain filter (spatial domain transmission filter) for transmitting the reference SRS. That is, in this case, the UE may assume that the UE transmission beam of the reference SRS and the UE transmission beam of the target SRS are the same.

The UE may determine the spatial relation of the PUSCH scheduled by the DCI based on a value of a given field (for example, SRS resource identifier (SRI) field) in the DCI (for example, DCI format 0_1). Specifically, the UE may use the spatial relation information (for example, "spatialRelationInfo" of the RRC information element) of the SRS resource determined based on the value (for example, SRI) of the given field for the PUSCH transmission.

When the codebook-based transmission is used for the PUSCH, in the UE, two SRS resources per SRS resource set may be configured by RRC, and one of the two SRS resources may be instructed by DCI (1-bit SRI field). When the non-codebook-based transmission is used for the PUSCH, in the UE, four SRS resources per SRS resource set may be configured by RRC, and one of the four SRS resources may be instructed by DCI (2-bit SRI field).

(Multi-TRPs)

Figure 4:
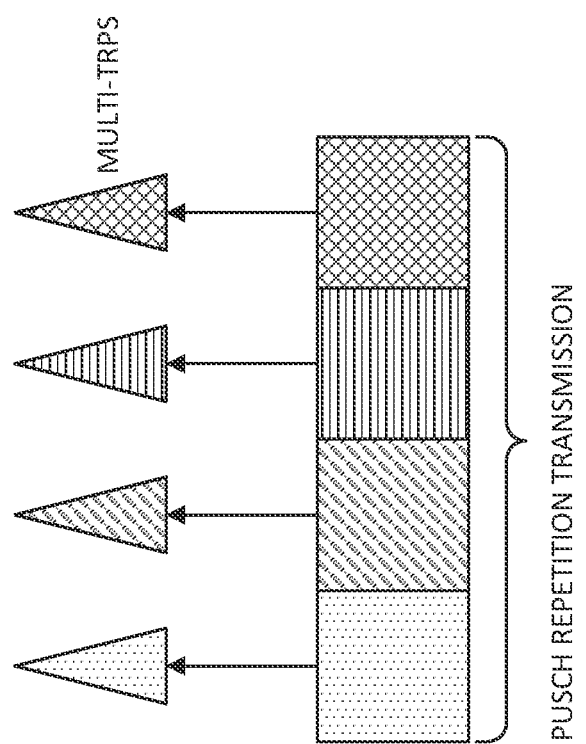
FIG. 4 is a diagram illustrating an example of repetition transmission of PUSCH in multi-TRPs.

In the NR, studies are underway to allow one or a plurality of transmission/reception points (TRPs) (Multi-TRPs (M-TRPs)) to perform DL transmission to the UE by using one or a plurality of panels (multi-panels). Furthermore, studies are underway to allow the UE to perform UL transmission to one or a plurality of TRPs (see FIG. 4).

However, when transmission for M-TRPs is to be performed using the existing Rel. 15/16 specification, there is a problem that performance, scheduling flexibility, and the like are limited. The transmission for the M-TRP corresponds to, for example, a plurality of PUSCH transmissions using different SRIs.

FIGS. 5A and 5B are diagrams illustrating examples of problems in a case where transmission for the M-TRP is performed using the existing Rel. 15/16 specification. In this example, it is assumed that the value=0 of the SRI field of the DCI corresponds to SRI #0, and the value=0 of the SRI field corresponds to SRI #1.

FIG. 5A corresponds to a case where transmission for the M-TRP is performed using the existing Rel. 15 specification. In this example, PUSCH #1 corresponding to SRI #0 is scheduled by using a given DCI (DCI1), and PUSCH #2 corresponding to SRI #1 is scheduled by using another DCI (DCI2).

Here, the DCI1 and the DCI2 have the same HARQ process ID (or HARQ process number) and indicate values of the same New Data Indicator (NDI) field. That is, PUSCH #2 means retransmission of the same data (transport block) as PUSCH #1. According to this example, PUSCH of the same data can be transmitted (retransmission, repetition transmission) using different beams (SRI) at short intervals.

On the other hand, in Rel. 15, DCI2 for scheduling another PUSCH #2 cannot be issued (notified) unless PUSCH #1 is transmitted, which is not preferable when PUSCH #1 and PUSCH #2 are transmitted with a small time difference.

FIG. 5B corresponds to a case where transmission for the M-TRP is performed using the existing Rel. 16 specification. In this example, PUSCH #1 corresponding to SRI #0 is scheduled by using DCI (DCI1) detected in a CORESET with a control resource set (CORESET) pool index=0, and PUSCH #2 corresponding to SRI #1 is scheduled by using DCI (DCI2) detected in a CORESET with a CORESET pool index=1.

In Rel. 16, when PUSCHs associated with different values of the CORESET pool index are scheduled, and the first PUSCH is scheduled by a CORESET (first PDCCH) of a value of one of the CORESET pool indexes, the UE may schedule a second PUSCH that starts before the end of the first PUSCH by a CORESET (second PDCCH) of a value of the other CORESET pool index that ends after the first PDCCH. FIG. 5B corresponds to this case.

That is, in Rel. 16, even before completion of transmission of the PUSCH #1 scheduled by the DCI #1, the DCI #2 for scheduling another PUSCH #2 can be issued (notified) in a case where the CORESET pool indexes of these DCIs are different.

However, according to the existing Rel. 15/16 specification, since the correspondence between the SRI field and the SRI is commonly configured regardless of the CORESET pool index in which the DCI is detected (corresponding to the SRI in the same SRS resource set), flexible transmission for the M-TRPs cannot be realized.

Therefore, according to the existing Rel. 15/16 specification, UL transmission over the M-TRP is not appropriately performed, and throughput may be reduced or communication quality may be degraded.

Therefore, the present inventors have conceived a method for controlling UL transmission over M-TRPs. According to one aspect of the present disclosure, for example, the UE may use different beams to perform UL transmissions for multi-TRPs.

Hereinafter, embodiments according to the present disclosure will be described in detail with reference to the drawings. The radio communication method according to each of the embodiments may be applied independently, or may be applied in combination with others.

In the present disclosure, "A/B" and "at least one of A and B" may be interchangeable.

In the present disclosure, activate, deactivate, instruct (or indicate), select, configure, update, determine, and the like may be replaced with each other.

In the present disclosure, the RRC, the RRC parameter, the RRC message, the RRC signaling, the higher layer parameter, the information element (IE), and the configuration may be replaced with each other. In the present disclosure, the MAC CE, the update command, the activation/deactivation command may be replaced with each other. In the present disclosure, "support", "control", "controllable", "operate", and "operable" may be replaced with each other.

In the present disclosure, a panel, a beam, a panel group, a beam group, a precoder, an uplink (UL) transmission entity, a TRP, spatial relation information (SRI), spatial relation, an SRS Resource Indicator (SRI), an SRS resource, a control resource set (CORESET), a physical downlink shared channel (PDSCH), a codeword, a base station, a predetermined antenna port (for example, a DeModulation Reference Signal (DMRS) port), a predetermined antenna port group (for example, a DMRS port group), a given group (for example, a Code Division Multiplexing (CDM) group, a given reference signal group, and a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state, a common TCI state, a QCL, a QCL assumption and the like may be replaced with each other.

Further, the TCI state identifier (ID) and the TCI state may be replaced with each other. The TCI state and the TCI may be replaced with each other.

In the present disclosure, the index, the ID, the indicator, the resource ID may be replaced with each other. In the present disclosure, the sequence, the list, the set, the group, the cohort, the cluster, the subset, and the like may be replaced with each other.

In the present disclosure, the TRP index, the CORESET pool index (CORESETPoolIndex), the pool index, the group index, and the like may be replaced with each other.

In the present disclosure, a single PDCCH (DCI) may be referred to as a PDCCH (DCI) of a first scheduling type (for example, scheduling type A (or type 1)). In addition, multi-PDCCHs (DCI) may be referred to as a PDCCH (DCI) of a second scheduling type (for example, scheduling type B (or type 2)).

In the present disclosure, regarding the single DCI, an i-th TRP (TRP #i) may mean an i-th TCI state, an i-th CDM group, and the like (i is an integer). Regarding multi-DCI, an i-th TRP (TRP #i) may mean a CORESET corresponding to a CORESET pool index=i, an i-th TCI state, an i-th CDM group, and the like (i is an integer).

In the present disclosure, the single PDCCH may be assumed to be supported when multi-TRPs use ideal backhaul. The multi-PDCCHs may be assumed to be supported when the multi-TRPs use non-ideal backhaul.

Note that the ideal backhaul may be referred to as a DMRS port group type 1, a reference signal related group type 1, an antenna port group type 1, a CORESET pool type 1, and the like. The non-ideal backhaul may be referred to as a DMRS port group type 2, a reference signal related group type 2, an antenna port group type 2, a CORESET pool type 2, and the like. The name is not limited thereto.

In the present disclosure, the multi-TRP (MTRP, M-TRP), the multi-TRP system, the multi-TRP transmission, and the multi-PDSCH may be replaced with each other.

In the present disclosure, the single DCI (sDCI), the single PDCCH, the single-DCI-based multi-TRP system, the sDCI-based MTRP, scheduling a plurality of PUSCHs (corresponding to different SRIs) by one DCI, sDCI-based MTRP transmission, and activating the two TCI states on at least one TCI codepoint may be replaced with each other.

In the present disclosure, the multi-DCI (mDCI), the multi-PDCCHs, the multi-DCI-based multi-TRP system, the mDCI-based MTRP, mDCI-based MTRP transmission, that multi-DCI is used for MTRP, scheduling a plurality PUSCHs (corresponding to different SRIs) by two DCIs, and configuring two CORESET pool indexes or CORESET pool index=1 (or a value of 1 or more) may be replaced with each other.

The repetition of the present disclosure may be read as MTRP-based repetition, Rel. 17 repetition, repetition applying different spatial relations, repetition PUSCH, repetition PUCCH, repetition transmission, and the like. Further, the repetition transmission in the following embodiments may correspond to at least one of a repetition transmission type A, a repetition transmission type B, and other repetition transmission types.

Note that the PUSCH in the following embodiments is assumed to be a repetition PUSCH, but may not be a repetition PUSCH (may be a PUSCH with a single transmission count). Therefore, in the present disclosure, the repetition PUSCH, the repetition of the PUSCH, and the PUSCH may be replaced with each other. In the repetition PUSCH, the same codeword/transport block may be transmitted in each PUSCH (each repetition). The repetition PUSCH may be replaced with a plurality of PUSCHs having the same content (for example, data/codeword/transport block).

In addition, the SRS resource set in the following embodiments may be read as an SRS resource set whose usage is a codebook or a non-codebook, or may be read as an SRS resource set for other usages.

Note that, in the present disclosure, hereinafter, "CORESET pool index=0 is configured" may be read as "CORESET pool index=0 is configured or CORESET pool index is not configured".

(Radio Communication Method)

First Embodiment

In the first embodiment, each of a plurality of DCIs (mDCI) for scheduling PUSCH repetition has an SRI field greater than 0 bits.

For example, consider the case where the UE is configured with mDCI-based MTRP, PUSCH #1 of PUSCH repetition (PUSCH #1 and #2) is scheduled by DCI1 with respect to a value of a given CORESET pool index (for example, CORESET pool index=0), and PUSCH #2 is scheduled by DCI2 with respect to a value of another CORESET pool index (for example, CORESET pool index=1).

Note that the UE configured with mDCI-based MTRP means that at least one CORESET whose CORESET pool index (RRC parameter "CORESETPoolIndex") has a value of 1 or more is configured for the UE.

In the above case, the UE may assume that the size of the SRI field is necessarily greater than 0 bits for both DCI1 and DCI2. Furthermore, the UE may also assume that there are always more than one SRS resource included in one or more SRS resource sets (for example, one or more SRS resource sets with usage=CB/NCB). According to these configurations, different beams (SRI) can be indicated for PUSCH #1 and PUSCH #2.

Note that the SRI field size of DCI1 and the SRI field size of DCI2 may be the same (Embodiment 1.1). In this case, the SRI field size may be determined by the number of SRS resources included in the above-described one or more SRS resource sets.

In addition, the SRI field size of DCI1 and the SRI field size of DCI2 may be different (Embodiment 1.2). In this case, the SRI field size may be determined by the number of SRS resources included in the above-described one or more SRS resource sets for each associated CORESET pool index. Note that the SRI field size of the DCI1 may be determined by the number of SRS resources included in one or more SRS resource sets associated with CORESET pool index=0.

Here, the correspondence between the SRS resource/SRS resource set and the associated CORESET pool index may be defined in advance by a specification, may be notified to the UE by at least one of the RRC parameter, the MAC CE, and the DCI, or may be determined based on the UE capability. The correspondence may be configured as described in a third embodiment described later, for example.

In Embodiment 1.2, the DCI payload size (number of bits) may be different for each CORESET pool index, even for the same DCI format. Therefore, the UE may assume that multiple PDCCH candidates (or CORESET or monitoring opportunities) associated with different CORESET pool indexes do not overlap for time/frequency resources. According to this assumption, it is possible to suppress an increase in UE load due to an excessive number of times of blind decoding (blind detection) of the PDCCH at a given timing.

According to the first embodiment described above, decoding the SRI for the M-TRPs can be appropriately determined.

Second Embodiment

In the second embodiment, at least one of the plurality of DCIs (mDCI) for scheduling PUSCH repetition may be allowed to have a 0-bit SRI field.

The second embodiment is roughly divided into Embodiment 2.1 in which one SRI field is included per DCI and Embodiment 2.2 in which a plurality of SRI fields is included per DCI.

Note that the content of the second embodiment may be applied to the first embodiment except that the 0-bit SRI field is not allowed.

Embodiment 2.1

In Embodiment 2.1, the UE may determine the SRI to be applied to the PUSCH based on at least one of an SRI field of DCI for scheduling the PUSCH and a CORESET pool index of a CORESET for the DCI (for example, the DCI is detected.).

In other words, the actual SRI indicated by the value of the SRI field may be selected based on the CORESET pool index associated with the DCI.

Figure 6:
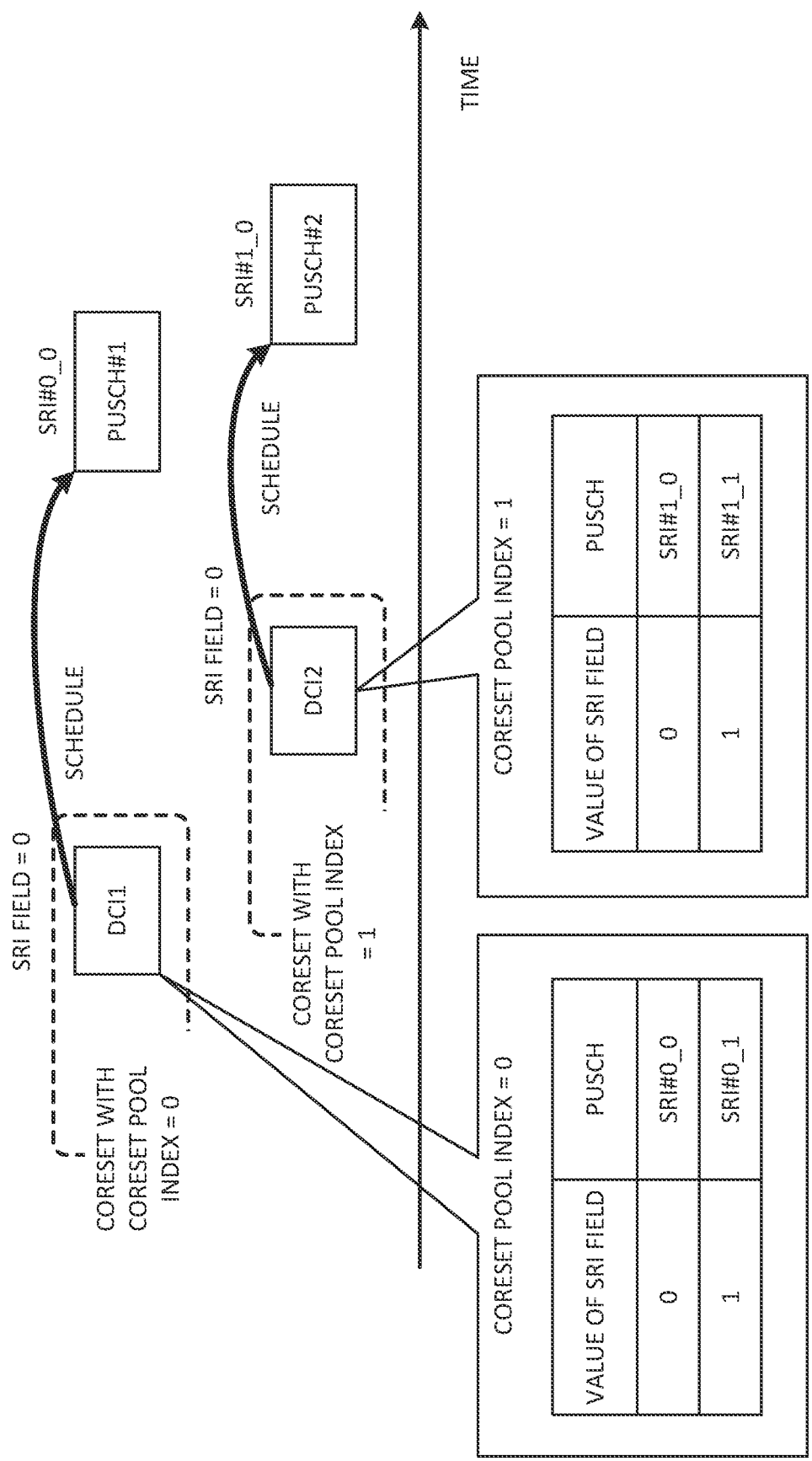
FIG. 6 is a diagram illustrating an example of control of the SRI of the PUSCH according to Embodiment 2.1.

FIG. 6 is a diagram illustrating an example of control of the SRI of the PUSCH according to Embodiment 2.1. In this example, PUSCH #1 is scheduled by using DCI (DCI1) detected in a CORESET with a CORESET pool index=0, and PUSCH #2 is scheduled by using DCI (DCI2) detected in a CORESET with a CORESET pool index=1.

The correspondence between the value of the SRI field and the actual SRI differs for each CORESET pool index, as shown in the bottom of FIG. 6. Note that, in the present disclosure, SRI #i_j (where i and j are numbers) may mean the j-th SRI corresponding to the CORESET pool index=i. SRI #i_j may be configured/activated by higher layer signaling explicitly or implicitly associated with the CORESET pool index.

In this example, since the SRI field value of DCI1 is 0, the UE determines that the SRI applied to PUSCH #1 is SRI #0_0. Further, since the SRI field value of DCI2 is 0, the UE determines that the SRI applied to PUSCH #2 is SRI #1_0.

Note that the SRI field size may be determined by the number of SRS resources included in one or more SRS resource sets for each associated CORESET pool index. Note that the SRI field size of the DCI1 may be determined by the number of SRS resources included in one or more SRS resource sets associated with CORESET pool index=0.

Here, the correspondence between the SRS resource/SRS resource set and the associated CORESET pool index may be defined in advance by a specification, may be notified to the UE by at least one of the RRC parameter, the MAC CE, and the DCI, or may be determined based on the UE capability. The correspondence may be configured as described in a third embodiment described later, for example.

Note that the SRI field size of DCI1 and the SRI field size of DCI2 may be the same. In this case, the number of SRS resources included in one or more SRS resource sets for each CORESET pool index may be assumed to be the same. According to this assumption, since the payload size of the DCI for the PUSCH can be made the same regardless of the CORESET pool index, it is possible to suppress an increase in UE load due to an excessive number of times of blind decoding (blind detection) of the PDCCH at a given timing.

In Embodiment 2.1, the number of SRS resources corresponding to a given CORESET pool may be 1. In this case, the SRI field size of the DCI detected by the CORESET pool index may be 0 bits. The UE may determine the actual SRI based only on the CORESET pool index, regardless of the SRI field.

Figure 7:
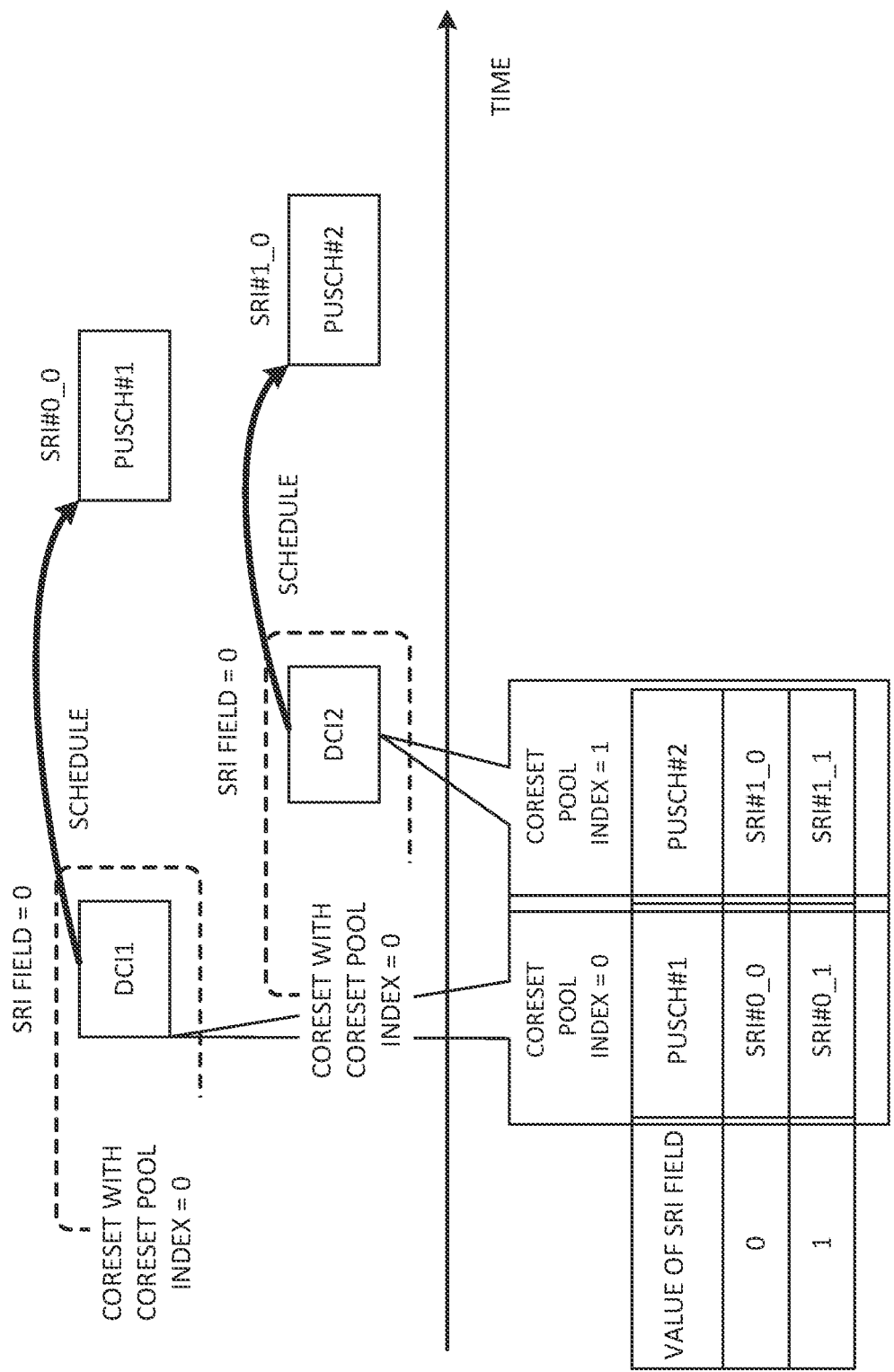
FIG. 7 is a diagram illustrating another example of control of the SRI of the PUSCH according to Embodiment 2.1.

FIG. 7 is a diagram illustrating another example of control of the SRI of the PUSCH according to Embodiment 2.1. FIG. 7 illustrates an example in which a plurality of (in this example, two) SRIs corresponding to one SRI code point (field value) are configured by higher layer signaling (for example, RRC signaling) over a plurality of CORESET pool indexes. PUSCH #k (k-th PUSCH) (k is an integer) may mean the SRI corresponding to the k-th TRP, or may mean the SRI corresponding to the k-th repetition. PUSCH #i may be replaced with the i-th SRI. Note that the present disclosure can also be applied to a case where a third or subsequent PUSCH is defined.

The UE may determine the SRI with reference to the first SRI for a PUSCH scheduled in a CORESET with a CORESET pool index=0. The UE may determine the SRI with reference to the second SRI for a PUSCH scheduled in a CORESET with a CORESET pool index=1. According to such a configuration, the SRI can be flexibly instructed for the M-TRP (when a different CORESET pool index is used) without increasing the field size of the DCI.

In FIG. 7, SRI #0_0 and SRI #1_0 are configured in association with the value of the SRI field=0. For example, SRI #0_0 corresponding to PUSCH #1 is applied to a PUSCH scheduled by the DCI with the value of the SRI field=0 detected in the CORESET with the CORESET pool index=0. In FIG. 7, because DCI1 has the value of the SRI field=0 and DCI2 has the value of the SRI field=0, SRI #0_0 is applied to PUSCH #1 and SRI #1_0 is applied to PUSCH #2.

In FIG. 7, the CORESET pool index may not be explicitly associated with SRI #i_j, for example, it may be determined that the i-th SRI corresponding to a given value of an SRI field is associated with the CORESET pool index=i.

Note that the correspondence between the SRI field and the actual SRI applied to the PUSCH #1 or #2 as illustrated in FIG. 7 is not limited to the mDCI-based MTRP, and may be used in the sDCI-based MTRP.

Embodiment 2.2

In Embodiment 2.2, the UE may select one of a plurality of SRI fields of DCI (also referred to as scheduling DCI) for scheduling the PUSCH, and determine the SRI to be applied to the PUSCH based on a value of the selected SRI field. The selection of the SRI field may be performed, for example, on the basis of the CORESET pool index of the CORESET for the DCI (for example, for detecting the DCI) or on the basis of the repetition index of the scheduled PUSCH (in other words, the number of repetitions).

For example, the SRI applied to the PUSCH may be determined based on the first SRI field (SRI field #1) when the scheduling DCI relates to CORESET pool index=0, or may be determined based on the second SRI field (SRI field #2) otherwise. More generally, the SRI applied to the PUSCH may be determined based on the (i+1)-th SRI field when the associated CORESET pool index=i (i is an integer).

For example, the SRI applied to the PUSCH may be determined based on the first SRI field (SRI field #1) when the PUSCH to be scheduled is the first transmission of the PUSCH repetition, or may be determined based on the second SRI field (SRI field #2) otherwise. More generally, the SRI applied to the PUSCH may be determined based on the i-th SRI field when the PUSCH is the i-th repetition (i is an integer).

Figure 8:
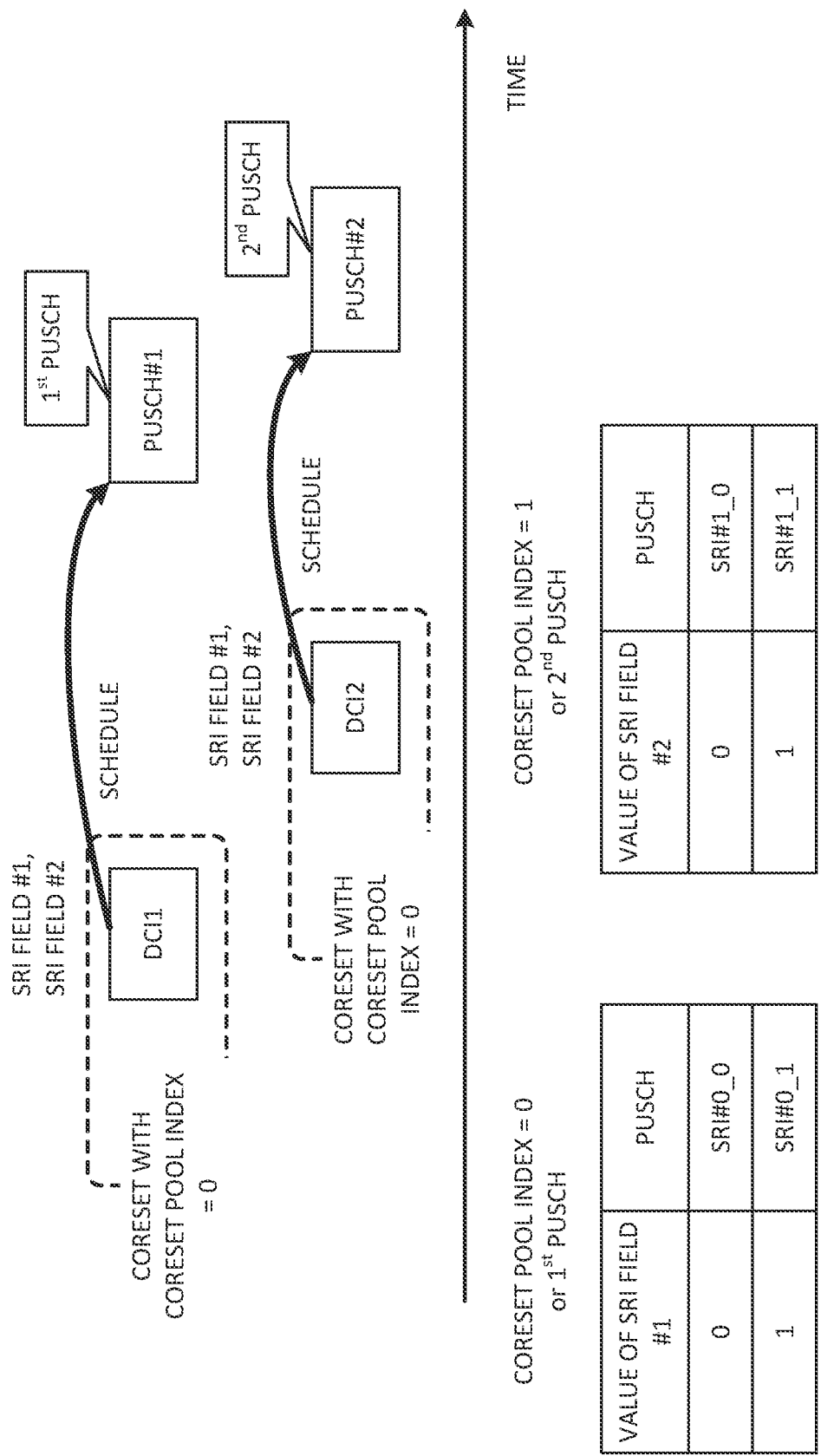
FIG. 8 is a diagram illustrating an example of control of the SRI of the PUSCH according to Embodiment 2.2.

FIG. 8 is a diagram illustrating an example of control of the SRI of the PUSCH according to Embodiment 2.2. In this example, PUSCH #1 is scheduled by using DCI (DCI1) detected in a CORESET with a CORESET pool index=0, and PUSCH #2 is scheduled by using DCI (DCI2) detected in a CORESET with a CORESET pool index=1.

Both DCI1 and DCI2 include a plurality of SRI fields (SRI field #1, #2). The correspondence between the value of each SRI fields and the actual SRI differs for each CORESET pool index (or PUSCH repetition), as shown in the bottom of FIG. 8.

Here, an example will be described in which the UE determines the SRI of the PUSCH on the basis of the number of repetitions of the PUSCH to be scheduled regardless of the CORESET pool index. Assuming that the PUSCH #1 is the first repetition and the PUSCH #2 is the second repetition as illustrated in the drawing, the UE determines the SRI applied to the PUSCH #1 based on the value of the SRI field #1 of the DCI1, and determines the SRI applied to the PUSCH #2 based on the value of the SRI field #2 of the DCI #2.

Note that one of the plurality of SRI fields that is not used may be used as another piece of information.

Note that the sizes of a plurality of SRI fields in a given DCI may be different. For example, the size of the SRI field #1 of DCI1 and the size of the SRI field #2 of DCI1 may be different. The size of each SRI field may be determined by the number of SRS resources included in one or more SRS resource sets for each associated CORESET pool index. Note that the size of SRI field #1 of the DCI1 may be determined by the number of SRS resources included in one or more SRS resource sets associated with CORESET pool index=0.

Here, the correspondence between the SRS resource/SRS resource set and the associated CORESET pool index may be defined in advance by a specification, may be notified to the UE by at least one of the RRC parameter, the MAC CE, and the DCI, or may be determined based on the UE capability. The correspondence may be configured as described in a third embodiment described later, for example.

Note that, for a given DCI format for scheduling the PUSCH, the sum of the sizes of the plurality of SRI fields may be the same regardless of the CORESET pool index, the scheduled PUSCH, or the like.

In Embodiment 2.2, the number of SRS resources corresponding to a given CORESET pool index/repetition may be 1. In this case, the size of the SRI field of the DCI for the CORESET pool index/repetition may be 0 bits.

Note that the determination of the SRI in Embodiment 2.2 is not limited to the case of mDCI-based MTRP, and may be used in the case of sDCI-based MTRP.

According to the second embodiment described above, the SRI for the M-TRPs can be appropriately determined. In addition, for example, by setting the actual SRI instructed by the SRI field of the DCI for each CORESET pool index, it is possible to apply different SRIs to a plurality of PUSCHs while suppressing the overhead of the SRI field (increase in the number of bits).

Third Embodiment

In Rel. 15 NR, the number of SRS resource sets with usage=codebook (CB) was at most 1, the number of SRS resources included in the SRS resource sets with usage=codebook was at most 2, the number of SRS resource sets with usage=non-codebook (NCB) was at most 1, and the number of SRS resources included in the SRS resource sets with usage=non-codebook was at most 4.

Therefore, in order to set the SRI for each TRP (for example, for each CORESET pool index or for each repetition index of PUSCH), it is necessary to eliminate (or loosen) the restriction on the number of SRS resources or the number of SRS resource sets.

Each of the following embodiments will be described.
  Embodiment 3.1: A number of SRS resource sets is defined as a maximum of P, and a number of SRS resources per SRS resource set is defined as a maximum of 2.
  Embodiment 3.2: A number of SRS resource sets is defined as a maximum of 1, and a number of SRS resources per SRS resource set is defined as a maximum of 2P.

Here, the value of P may correspond to the number of TRPs or may correspond to a different number of CORESET pool indexes configured for the UE (or a maximum CORESET pool index+1 configured for the UE). For example, when CORESET with CORESET pool index=1 is set, P=2 may be true. Of course, the value of P is not limited to 2.

In Embodiments 3.1 to 3.2, when not particularly mentioned, the SRS resource set and the SRS resource with usage=CB will be described on the premise of P=2, but they may be replaced with the SRS resource set and the SRS resource with usage=NCB and other usages. For example, when the SRS resource set and the SRS resource with usage=NCB are replaced with them, the number of SRS resource sets may be the same value, but the number of SRS resources per SRS resource set may be replaced with twice the number of SRS resources with usage=CB (for example, 4 in Embodiment 3.1, and 4P in Embodiment 3.2.).

Further, hereinafter, in the present disclosure, the CORESET pool index, the repetition index of the PUSCH, and the higher layer index may be replaced with each other.

Embodiment 3.1

In Embodiment 3.1, the UE is configured with a plurality of SRS resource sets for the same usage. One SRS resource set corresponds to one TRP (CORESET pool index). The correspondence between CORESET pool index and the SRS resource set ID may be explicitly configured by higher layer signaling, or may be associated with CORESET pool index=0, 1, . . . in order from the smaller side of the SRS resource set ID (or the SRS resource ID). Note that "from the smaller side" in the present disclosure may be read as "from the larger side".

FIGS. 9A and 9B are diagrams illustrating an example of configurations of an SRS resource set and an SRS resource according to Embodiment 3.1. FIG. 9A illustrates an SRS resource associated with SRS resource set ID=0, and FIG. 9B illustrates an SRS resource associated with SRS resource set ID=1.

Here, SRS #x_y may mean the SRS resource of the y (or y+1)-th entry of SRS resource set ID=x (the same applies to the following drawings). Furthermore, the illustrated SRS resource set ID and SRS resource ID are merely examples, and are not limited to these values (the same applies to the following drawings).

The SRS resource set ID=0 may be used to indicate the SRI of the CORESET in which the CORESET pool index=0 is set. The SRS resource set ID=1 may be used to indicate the SRI of the CORESET in which the CORESET pool index=1 is set.

In this example, SRI #0_0 and SRI #0_1 described above with reference to FIG. 6 and the like may be SRS #0_0 (SRS resource corresponding to SRS resource ID=0) and SRS #0_1 (SRS resource corresponding to SRS resource ID=1), respectively.

In addition, SRI #1_0 and SRI #1_1 described above with reference to FIG. 6 and the like may be SRS #1_0 (SRS resource corresponding to SRS resource ID=2) and SRS #1_1 (SRS resource corresponding to SRS resource ID=2), respectively.

Embodiment 3.2

In Embodiment 3.2, W (W is an integer) SRS resources included in one SRS resource set correspond to one TRP (CORESET pool index). The correspondence between CORESET pool index and the SRS resource ID may be explicitly configured by higher layer signaling, or may be associated with CORESET pool index=0, 1, . . . in order from the smaller side of the SRS resource ID for each W SRS resources.

For each corresponding CORESET pool index, the value of W may be different. For example, of the four SRS resources in the SRS resource set, one SRS resource may be associated with a CORESET pool index=0, and the remaining three SRS resources may be associated with a CORESET pool index=1.

Note that the value of W may be the number of SRS resources for determining the SRI field size of the DCI, and may be, for example, a value obtained by applying a floor function or a ceiling function to a value obtained by dividing the number of SRS resources in the SRS resource set with usage=CB/NCB by P.

Figure 10:
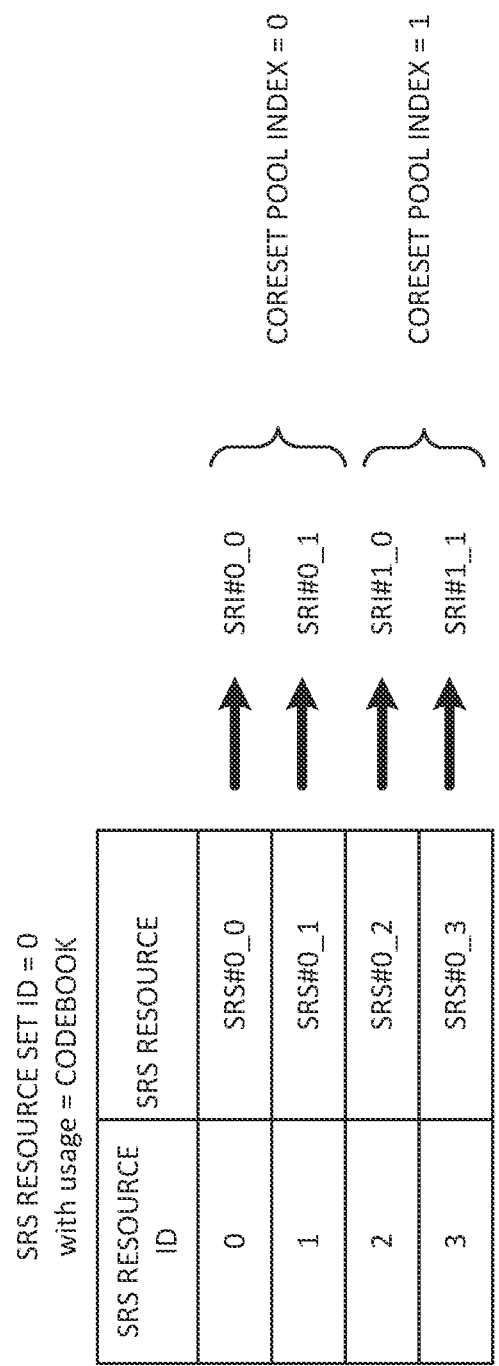
FIG. 10 is a diagram illustrating an example of configurations of an SRS resource set and an SRS resource according to Embodiment 3.2.

FIG. 10 is a diagram illustrating an example of configurations of an SRS resource set and an SRS resource according to Embodiment 3.2. This example shows the SRS resource associated with SRS resource set ID=0. The SRS resource set with the SRS resource set ID=0 in this example is associated with 2P=4 SRS resources, for example, W=2.

Of the SRS resource set ID=0, W=2 SRS resources from the smallest one may be used to indicate the SRI of the CORESET in which the CORESET pool index=0 is set. Of the SRS resource set ID=0, W=2 SRS resources from the next smaller one may be used to indicate the SRI of the CORESET in which the CORESET pool index=1 is set.

In this example, SRI #0_0 and SRI #0_1 described above with reference to FIG. 6 and the like may be SRS #0_0 (SRS resource corresponding to SRS resource ID=0) and SRS #0_1 (SRS resource corresponding to SRS resource ID=1), respectively.

In addition, SRI #1_0 and SRI #1_1 described above with reference to FIG. 6 and the like may be SRS #0_2 (SRS resource corresponding to SRS resource ID=2) and SRS #0_3 (SRS resource corresponding to SRS resource ID=3), respectively.

According to the third embodiment described above, the UE can appropriately determine the spatial relations for the M-TRPs.

Others

Note that at least one of the above-described embodiments may be applied only to a UE that supports a particular UE capability or a UE that has reported (to support) the particular UE capability.

The particular UE capability may indicate at least one of the following:
  whether or not to support PUSCH repetition using different spatial relationships (or SRIs);
  whether or not to support association of a CORESET pool index with an SRI;
  maximum number of supported repetitions/SRI number; and
  maximum supported number of SRS resource sets/number of SRS resources.

Furthermore, at least one of the above-described embodiments may be applied when the UE configures specific information related to the foregoing embodiments by higher layer signaling (If not set, for example, the operation of Rel. 15/16 is applied.). For example, the specific information may be information indicating that the different spatial relations for PUSCH repetition is enabled, any RRC parameter for a specific release (for example, Rel. 17), or the like.

Further, each of the above embodiments may be applied to a case where (the operation of) multi-TRPs or multiple panels are configured in the UE, or may be applied to other cases.

Note that the CORESET pool index of each embodiment of the present disclosure may be replaced with a TCI state ID or a CORESET ID.

(Radio Communication System)

Hereinafter, a configuration of a radio communication system according to one embodiment of the present disclosure will be described. In this radio communication system, communication is performed by using any one of or a combination of the radio communication methods according to the above-described embodiments of the present disclosure.

Figure 11:
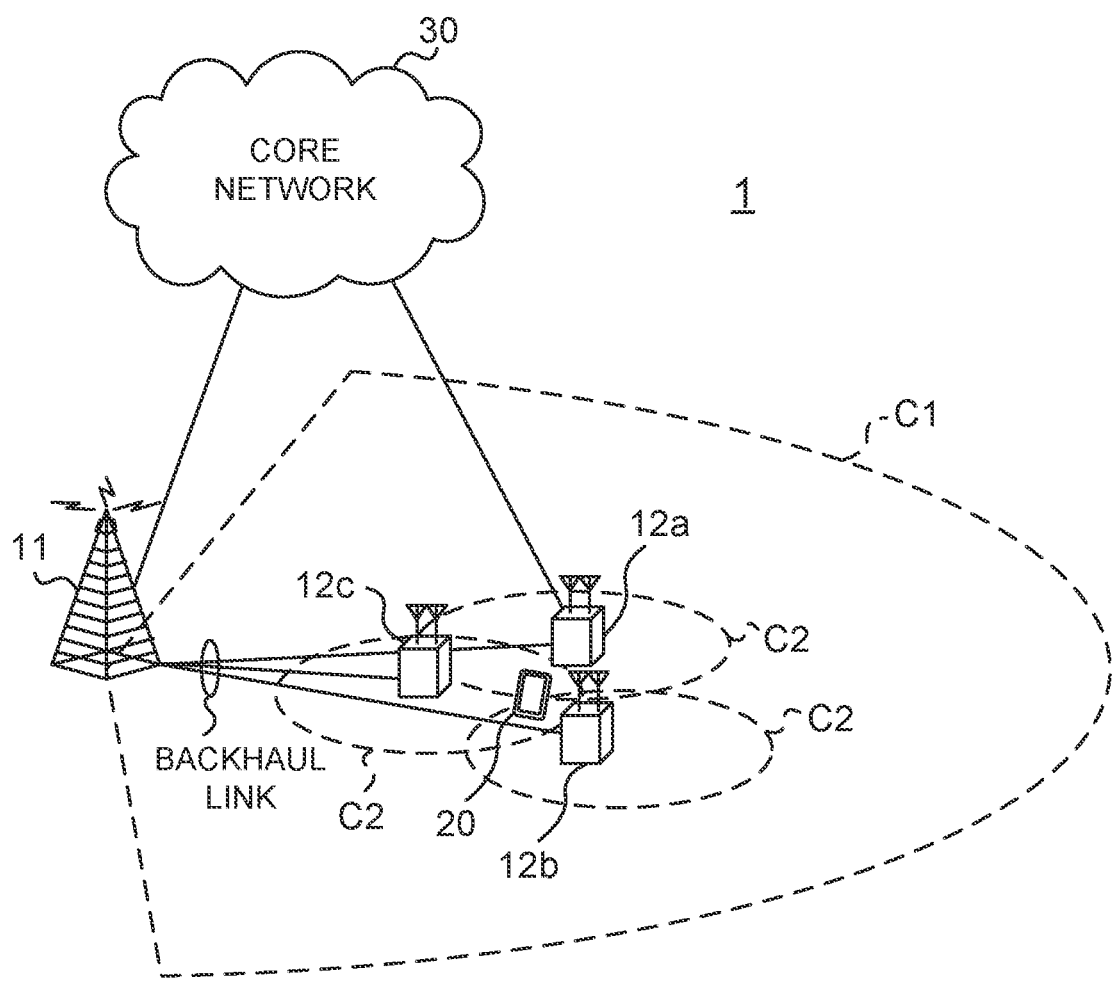
FIG. 11 is a diagram illustrating an example of a schematic configuration of a radio communication system according to one embodiment.

FIG. 11 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a Macro cell C1 with a relatively wide coverage, and base stations 12 (12a to 12c) disposed in the Macro cell C1, each of which forms a Small cell C2 narrower than the Macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as a "base station 10", unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first Frequency Range 1 (FR1) and/or a second Frequency Range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that frequency ranges, definitions, or the like of the FR1 and FR2 are not limited to these, and, for example, the FR1 may correspond to a higher frequency range than the FR2.

Further, the user terminal 20 may perform communication in each CC by using at least one of Time Division Duplex (TDD) and Frequency Division Duplex (FDD).

The plurality of base stations 10 may be connected in a wired (e.g., an optical fiber or an X2 interface in compliance with common public radio interface (CPRI)) or wireless manner (e.g., NR communication). For example, in a case where NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an Evolved Packet Core (EPC), a 5G Core Network (5GCN), or a Next Generation Core (NGC), or the like.

The user terminal 20 may be a terminal corresponding to at least one of communication methods such as LTE, LTE-A, or 5G.

In the radio communication system 1, a radio access scheme based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like, may be used.

A radio access method may also be referred to as a waveform. Note that, in the radio communication system 1, another radio access method (for example, another single carrier transmission method or another multi-carrier transmission method) may be used as a radio access method for the UL or the DL.

In the radio communication system 1, as a downlink channel, a physical downlink shared channel (PDSCH), a physical broadcast channel (PBCH), a physical downlink control channel (PDCCH), or the like, shared by the user terminals 20 may be used.

Further, in the radio communication system 1, as an uplink channel, a physical uplink shared channel (PUSCH), a physical uplink control channel (PUCCH), a physical random access channel (PRACH), or the like, shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted by the PDCCH. The lower layer control information may include, for example, Downlink Control Information (DCI) including scheduling information of at least one of the PDSCH or the PUSCH.

Note that DCI that schedules a PDSCH may also be referred to as DL assignment, DL DCI, or the like, and DCI that schedules a PUSCH may also be referred to as a UL grant, UL DCI, or the like. Note that a PDSCH may be replaced with DL data, and a PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor a CORESET associated with a given Search Space on the basis of a Search Space configuration.

One search space may correspond to a PDCCH candidate corresponding to one or more aggregation levels. One or more search spaces may be referred to as a search space set. Note that "Search Space", "Search Space set", "Search Space configuration", "Search Space set configuration", "CORESET", "CORESET configuration", and the like in the present disclosure may be replaced with one another.

Uplink Control Information (UCI) including at least one of Channel State Information (CSI), delivery acknowledgement information (which may be referred to as, for example, a hybrid automatic repeat request acknowledgement (HARQ-ACK), ACK/NACK, or the like), or a Scheduling Request (SR) may be transmitted by the PUCCH. A random access preamble for establishing connection with a cell may be transmitted on the PRACH.

Note that, in the present disclosure, downlink, uplink, or the like may be expressed without "link". Furthermore, various channels may be expressed without adding "Physical" to the beginning thereof.

In the radio communication system 1, a synchronization signal (SS), a downlink reference signal (DL-RS), and the like, may be transmitted. In the radio communication system 1, a Cell-Specific Reference Signal (CRS), a Channel State Information Reference Signal (CSI-RS), a DeModulation Reference Signal (DMRS), a Positioning Reference Signal (PRS), a Phase Tracking Reference Signal (PTRS), or the like, may be transmitted as the DL-RS.

The synchronization signal may be, for example, at least one of a Primary Synchronization Signal (PSS) and a Secondary Synchronization Signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)."

(Base Station)

Figure 12:
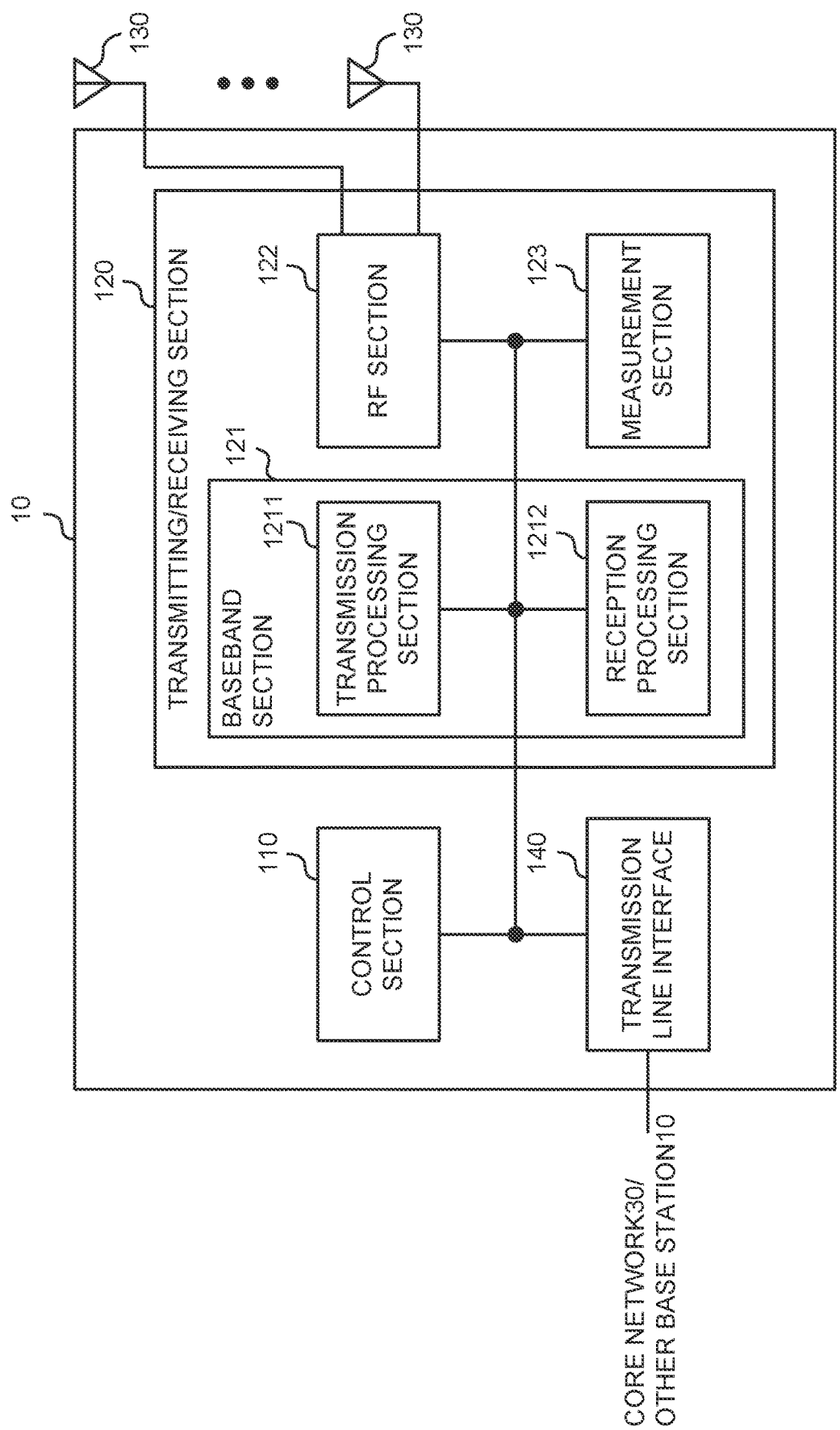
FIG. 12 is a diagram illustrating an example of a configuration of a base station according to one embodiment.

FIG. 12 is a diagram illustrating an example of a configuration of a base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be included.

Note that, although this example mainly describes a functional block which is a characteristic part of the present embodiment, the base station 10 may be assumed also to have another functional block that is necessary for radio communication. Part of processing of each unit described below may be omitted.

The control section 110 controls an entire base station 10. The control section 110 can include a controller, a control circuit, or the like, which is described on the basis of common recognition in a technical field according to the present disclosure.

The control section 110 may control signal generation, scheduling (for example, resource allocation or mapping), or the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of a state of the base station 10, management of a radio resource, or the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a base band circuit, a filter, a phase shifter, a measurement circuit, a transmission/reception circuit, or the like, which is described on the basis of common recognition in a technical field according to the present disclosure.

The transmitting/receiving section 120 may be constituted as an integrated transmitting/receiving section, or may be constituted by a transmitting section and a receiving section. The transmitting section may include the transmission processing section 1211 and the RF section 122. The receiving section may include the reception processing section 1212, the RF section 122, and the measurement section 123.

The transmitting/receiving antenna 130 can include an antenna, for example, an array antenna, or the like, which is described on the basis of common recognition in a technical field according to the present disclosure.

The transmitting/receiving section 120 may transmit the above-described downlink channel, synchronization signal, Downlink Reference Signal, or the like. The transmitting/receiving section 120 may receive the above-described uplink channel, Uplink Reference Signal, or the like.

The transmitting/receiving section 120 may form at least either a transmission beam or a reception beam by using digital beam forming (for example, precoding), analog beam forming (for example, phase rotation), or the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, on, for example, data, control information, and the like, acquired from the control section 110, to generate a bit string to be transmitted.

The transmitting/receiving section 120 (transmission processing section 1211) may perform transmission processing such as channel encoding (which may include error correcting encoding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, or the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, or the like on the signal in the radio frequency range received by the transmitting/receiving antenna 130.

The transmitting/receiving section 120 (reception processing section 1212) may apply reception processing such as analog-digital conversion, fast fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data, and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be outputted to the control section 110.

The transmission line interface 140 may transmit/receive a signal (backhaul signaling) to and from an apparatus included in the core network 30, another base stations 10, or the like, and may acquire, transmit, or the like user data (user plane data), control plane data, or the like for the user terminal 20.

Note that a transmitting section and a receiving section of the base station 10 in the present disclosure may include at least one of the transmitting/receiving section 120, the transmitting/receiving antenna 130, or the transmission line interface 140.

Note that the transmitting/receiving section 120 may transmit DCI to the user terminal 20 based on a specific assumption regarding a size of a sounding reference signal resource indicator (SRI) field of the DCI scheduling a physical uplink shared channel (PUSCH) when a control resource set (CORESET) pool index is configured to at least one CORESET.

The transmitting/receiving section 120 may receive the PUSCH to be transmitted by using a precoder based on spatial relation information (or SRI) determined by the user terminal 20 based on at least one of the SRI field and a CORESET pool index of a CORESET in which the DCI is detected.

(User Terminal)

Figure 13:
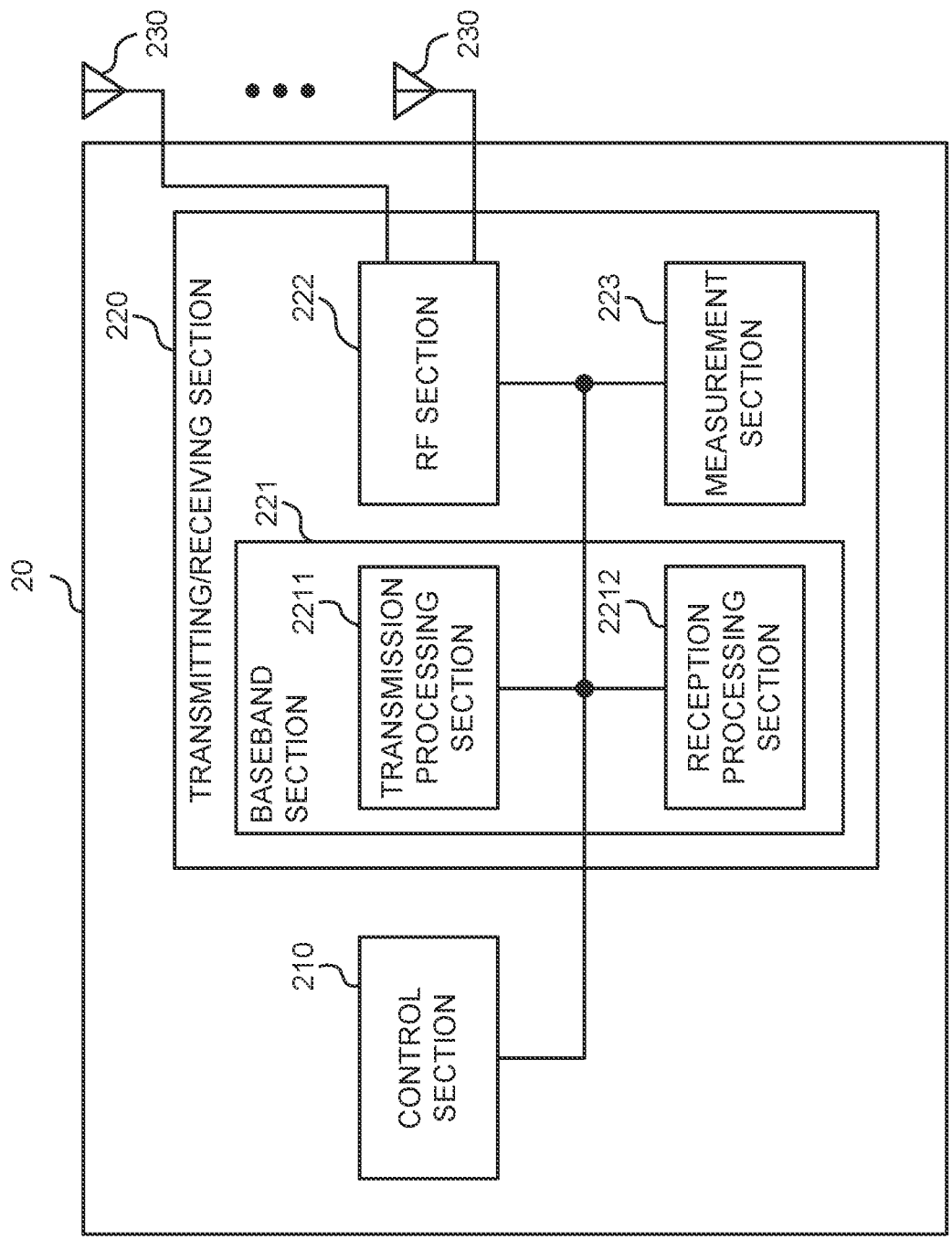
FIG. 13 is a diagram illustrating an example of a configuration of a user terminal according to one embodiment.

FIG. 13 is a diagram illustrating an example of a configuration of a user terminal according to one embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes functional blocks of a characteristic part of the present embodiment, it may be assumed that the user terminal 20 includes other functional blocks that are necessary for radio communication as well. Part of processing of each unit described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may forward the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be implemented by a transmitter/receiver, an RF circuit, a baseband circuit, a filter, a phase shifter, a measurement circuit, a transmitting/receiving circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmitting/receiving antenna 230.

Note that the transmitting/receiving section 220 may receive (may be replaced with decode) DCI based on a specific assumption regarding a size of a sounding reference signal resource indicator (SRI) field of the DCI scheduling a physical uplink shared channel (PUSCH) when a control resource set (CORESET) pool index is configured to at least one CORESET.

Here, the specific assumption may be, for example, an assumption that the size of the SRI field is necessarily larger than 0 bits, or an assumption that the size of the SRI field is allowed to be 0 bits.

The control section 210 may determine spatial relation information (or SRI) for the PUSCH based on at least one of the SRI field and a CORESET pool index of a CORESET in which the DCI is detected.

The transmitting/receiving section 220 may transmit the PUSCH by using a precoder (or a spatial domain transmission filter) based on the spatial relation information.

The control section 210 may select one of a plurality of SRI fields included in the DCI (for example, SRI field #1 or #2) based on a CORESET pool index (or PUSCH repetition index) of a CORESET in which the DCI is detected, and determine spatial relation information for the PUSCH based on the selected SRI field.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one apparatus or the plurality of apparatuses with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 14:
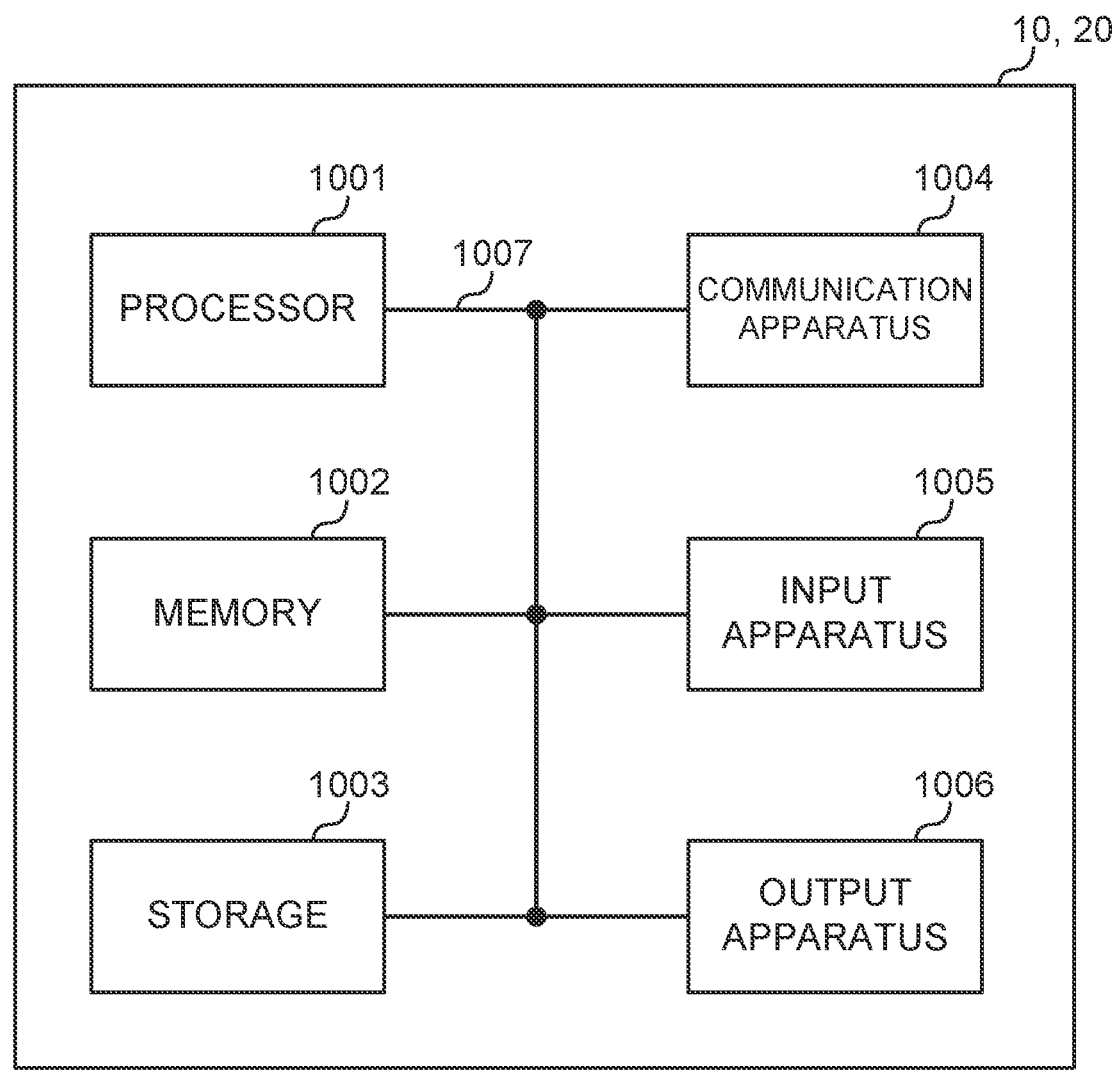
FIG. 14 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 14 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be read as interchangeable with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by, for example, reading given software (program) onto hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and the like from at least one of the storage 1003 and the communication apparatus 1004 into the memory 1002, and executes various processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmission/reception device) for performing inter-computer communication via at least one of a wired network and a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating the transmission section 120a (220a) and the reception section 120b (220b) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these apparatus, including the processor 1001, the memory 1002 and so on are connected by the bus 1007 so as to communicate information. The bus 1007 may be formed with a single bus, or may be formed with buses that vary between apparatus.

Further, the base station 10 and the user terminal may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these hardware.

VARIATIONS

Note that terms described in the present disclosure and terms necessary for understanding the present disclosure may be replaced with terms that have the same or similar meanings. For example, a channel, a symbol, and a signal (signal or signaling) may be replaced with one another. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transmitting/receiving section in the frequency domain, specific windowing processing performed by a transmitting/receiving section in the time domain, and the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

A radio frame, a subframe, a slot, a mini slot and a symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be read as interchangeable with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to assign radio resources (a frequency bandwidth, transmission power, and the like that can be used in each user terminal) to each user terminal in TTI units. Note that the definition of TTIs is not limited to this.

The TTI may be a transmission time unit such as a channel-coded data packet (transport block), a code block, a codeword, or the like, or may be a processing unit such as scheduling or link adaptation. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI," one or more TTIs (that is, one or multiple slots or one or more mini slots) may be the minimum time unit of scheduling. Also, the number of slots (the number of mini slots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one mini slot, one subframe or one TTI in length. One TTI, one subframe, and the like may each include one or more resource blocks.

Note that one or more RBs may be referred to as a physical resource block (PRB), a sub-carrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. A PRB may be defined in a given BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given channel/signal outside the active BWP. Note that "cell", "carrier", etc. in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be instructed by a given index.

Names used for, for example, parameters in the present disclosure are in no respect limitative. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC Connection Setup message, an RRC Connection Reconfiguration message, and so on. Further, notification of the MAC signaling may be performed using, for example, a MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other suitable terms.

At least one of the base station and mobile station may be called as a transmission apparatus, a reception apparatus, a radio communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be read as interchangeable with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be read as interchangeable with a side channel.

Likewise, the user terminal in the present disclosure may be read as interchangeable with the base station. In this case, the base station 10 may be configured to have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, although various methods have been illustrated in the present disclosure with various components of steps using exemplary orders, the specific orders that are illustrated herein are by no means limiting.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) ((xG (x is, for example, an integer or decimal)), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

Reference to elements with designations such as "first", "second", and the like as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may encompass a wide variety of operations. For example, "determining" may be regarded as judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "judge" and "determine" as used herein may be read as interchangeable with "assuming", "expecting", "considering", or the like.

The terms "connected" and "coupled" used in the present disclosure, or all variations thereof mean all direct or indirect connections or coupling between two or more elements, and can include the presence of one or more intermediate elements between two elements "connected" or "coupled" with each other. The coupling or connection between the elements may be physical, logical, or a combination of these. For example, the term "connection" is interchangeable with "access".

In the present disclosure, when two elements are connected, the two elements can be considered to be "connected" or "coupled" with each other by using one or more electrical wires, cables, printed electrical connections, and the like, and using, as some non-limiting and non-inclusive examples, electromagnetic energy and the like having a wavelength in a radio frequency domain, a microwave domain, and an optical (both visible and invisible) domain.

In the present disclosure, the phrase "A and B are different" may mean "A and B are different from each other". Note that the phrase may mean that "A and B are different from C". The terms such as "leave", "coupled", and the like may be interpreted similarly to "different".

In the present disclosure, when "include", "including", and variations thereof are used, these terms are intended to be inclusive similarly to the term "comprising". The term "or" used in the present disclosure is intended not to be an exclusive-OR.

In the present disclosure, when articles in English such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
  a receiver that, when a control resource set (CORESET) pool index is configured for each of multiple CORESETs, receives multiple downlink control information (DCI) for scheduling a physical uplink shared channel (PUSCH); and
  a processor that determines a number of bits of a sounding reference signal resource indicator (SRI) field of each of the multiple DCI, based on a number of SRS resources included in an SRS resource set associated with a CORESET pool index of a CORESET in which each of the multiple DCI is detected, and determines spatial relation information for the PUSCH, based on the SRI field and the CORESET pool index.

2. The terminal according to claim 1, wherein transmission of the PUSCH is a non-codebook based transmission, and a precoder for the transmission of the PUSCH is determined based on the spatial relation information.

3. A radio communication method for a terminal, comprising:
  when a control resource set (CORESET) pool index is configured for each of multiple CORESETs, receiving multiple downlink control information (DCI) for scheduling a physical uplink shared channel (PUSCH);
  determining a number of bits of a sounding reference signal resource indicator (SRI) field of each of the multiple DCI, based on a number of SRS resources included in an SRS resource set associated with a CORESET pool index of a CORESET in which each of the multiple DCI is detected; and
  determining spatial relation information for the PUSCH, based on the SRI field and the CORESET pool index.

4. A base station comprising:
  a transmitter that, when a control resource set (CORESET) pool index is configured for each of multiple CORESETs, transmits, to a terminal, multiple downlink control information (DCI) for scheduling a physical uplink shared channel (PUSCH),
  wherein a number of bits of a sounding reference signal resource indicator (SRI) field of each of the multiple DCI is determined based on a number of SRS resources included in an SRS resource set associated with a CORESET pool index of a CORESET in which each of the multiple DCI is detected; and
  a receiver that receives the PUSCH based on spatial relation information determined by the terminal based on the SRI field and the CORESET pool index.

5. A system comprising a terminal and a base station, wherein
  the terminal comprises:
    a receiver that, when a control resource set (CORESET) pool index is configured for each of multiple CORESETs, receives multiple downlink control information (DCI) for scheduling a physical uplink shared channel (PUSCH); and
    a processor that determines a number of bits of a sounding reference signal resource indicator (SRI) field of each of the multiple DCI, based on a number of SRS resources included in an SRS resource set associated with a CORESET pool index of a CORESET in which each of the multiple DCI is detected, and determines a spatial relation information for the PUSCH, based on the SRI field and the CORESET pool index, and the base station comprises:
  a transmitter that transmits the multiple DCI to the terminal; and
  a receiver that receives the PUSCH.

\* \* \* \* \*